Dec. 13, 1966　　　　R. B. ROSE, SR　　　　3,290,813

CAR TOP SIGN

Filed June 24, 1966　　　　　　　　　　　2 Sheets-Sheet 1

INVENTOR.
RALPH B. ROSE SR.

BY

ATTORNEY.

Dec. 13, 1966  R. B. ROSE, SR  3,290,813
CAR TOP SIGN
Filed June 24, 1966  2 Sheets-Sheet 2
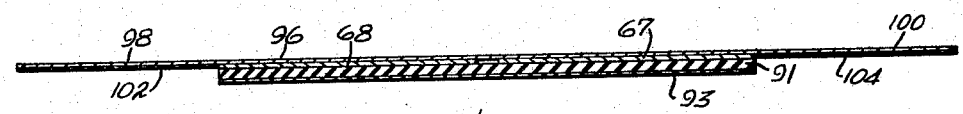
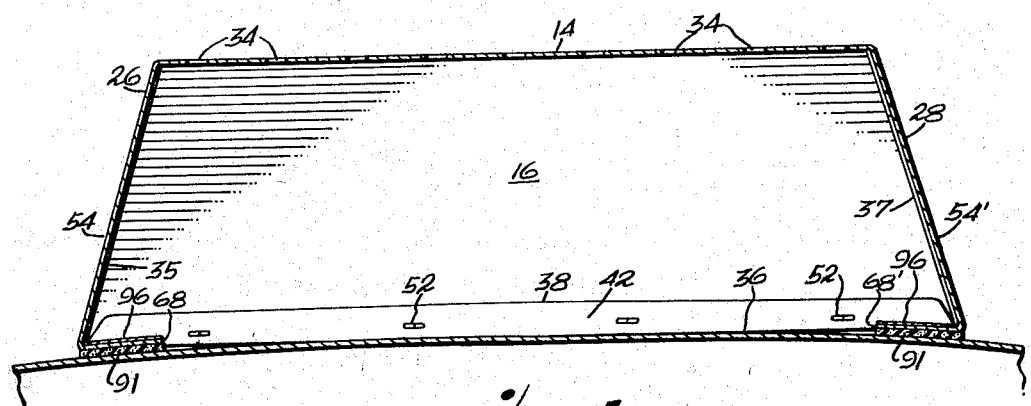
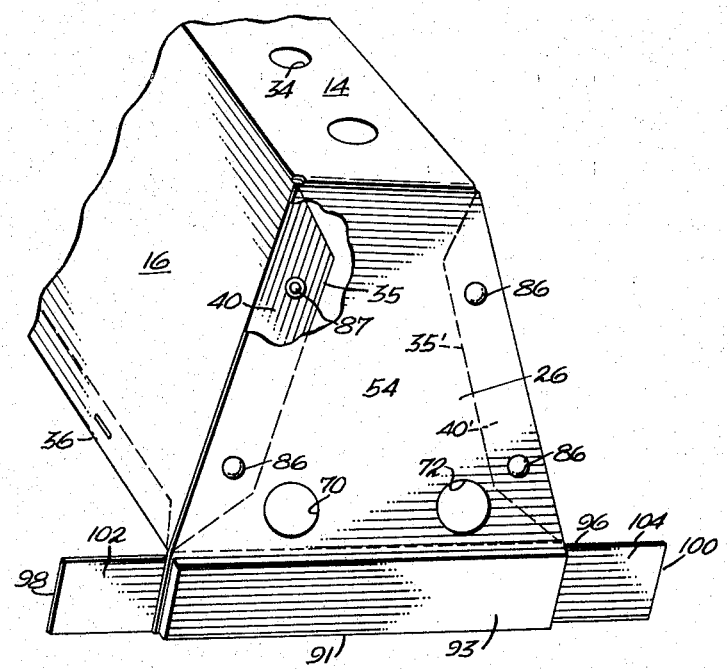
INVENTOR.
RALPH B. ROSE SR,
BY
ATTORNEY.

United States Patent Office 3,290,813
Patented Dec. 13, 1966

3,290,813
CAR TOP SIGN
Ralph B. Rose, Sr., 4370 SW. 5th St., Miami, Fla.
Filed June 24, 1966, Ser. No. 560,280
10 Claims. (Cl. 40—129)

This invention relates to a car top sign and, more particularly, to a car top sign which is adapted to be adhesively mounted in an inverted shell type relation on the roof of an automobile.

As is perhaps well known, advertising, such as that used in political campaigns, often involves the employment of car top signs. Such car top signs are desirable but have presented a problem in that the apparatus required to securely mount such a car top sign on an automobile has, in the past, been quite expensive. The instant invention provides for a car top sign of weatherproof or outdoor grade cardboard having an advertising message printed thereon which sign is adapted to be adhesively and removably mounted on the roof of an automobile and which does not include additional side means or straps to hold it in position on an automobile.

It is, accordingly, an object of this invention to provide a weather-resistant, foldable car top sign adapted to be formed into a car top sign and which includes adhesive means for mounting it to the exterior of an automobile roof.

It is another object to provide a weather-resistant car top sign to be adhesively mounted to an automobile roof which includes a top panel having equal length longitudinal side edges and opposed main sign panels folded out of the plane of the top panel and connected together by front and rear panels to define an inverted shell sign and with the extending edges of the front and rear panel having feet adapted to be folded so as to overlay the automobile roof and carrying an adhesive surface and access openings in the car top sign shell body to apply pressure to the adhesive means to connect the car top sign to the automobile roof.

It is another object of the instant invention to provide a device which is set forth more fully hereinafter and which is adapted to be formed of sheet material by folding the sheet material into an inverted shell shape which includes panels having signs connected thereto which panels are connected together by front and rear panels having adhesive means on the extending edge thereof to connect to an automobile roof top which front and rear panels include access means to apply pressure to the adhesive means, said adhesive means being disposed within the shell as a partial floor thereof.

It is another object of this invention to provide a car top sign of the type described hereinbefore having its parts arranged, constructed and adapted to be folded in the form of a shell type car sign to be mounted adhesively to the roof of an automobile which is inexpensive to manufacture, relatively easy to assemble, and may be quickly and readily removably but securely attached to an automobile car top by adhesive means.

In accordance with these and other objects which will become apparent hereinafter, the instant invention will now be described with reference to the accompanying drawings in which:

FIG. 4 is a view in cross section taken along the plane indicated by the line 4—4 of FIG. 3 and looking in the direction of the arrows;

FIG. 5 is a view in cross section taken along the plane indicated by the line 5—5 of FIG. 1 and looking the direction of the arrows; and FIG. 6 is a view similar to that of FIG. 3 which has been partially broken away to illustrate the details of construction of a preferred embodiment of the instant invention, slightly modified with respect to that of FIG. 3.

Figure 1:
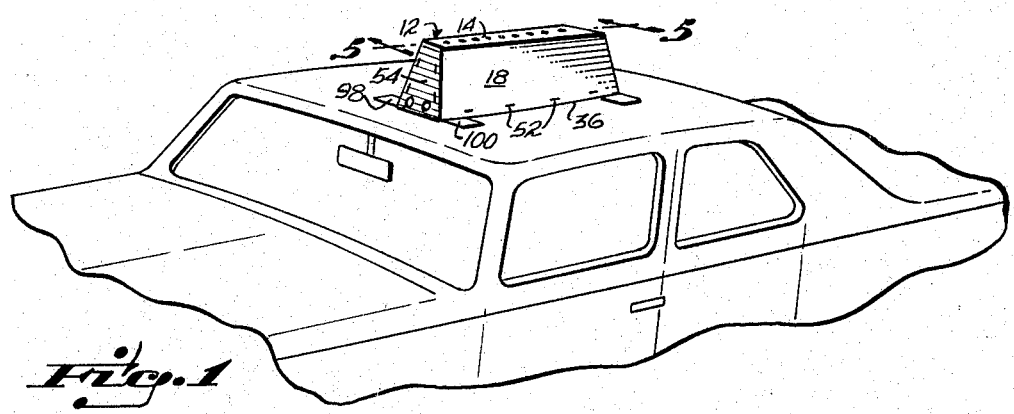
FIG. 1 is a perspective view of an automobile having the car top sign of the instant invention installed thereon.
Figure 2:
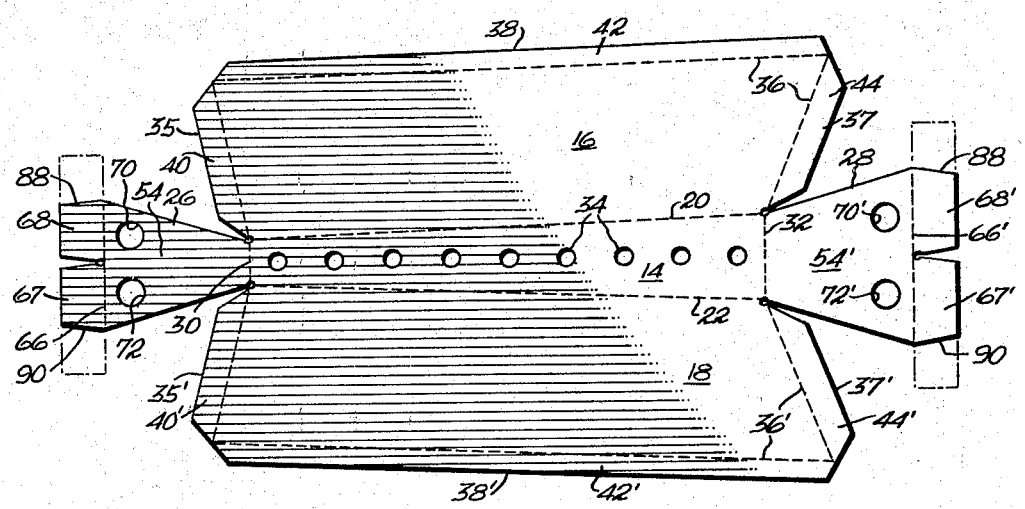
FIG. 2 is a plan view of a sheet of material which has been cut so as to be adapted to be folded along the fold lines indicated by dotted lines into the configuration seen in FIGS. 1, 3 and 6.

Referring to the drawings wherein like reference characters designate like or corresponding parts throughout the different views, and referring particularly to FIG. 1, the numeral 12 generally designates the car top sign of the instant invention which is preferably of weatherproof or outdoor grade cardboard and which, as can be seen in FIG. 2, is of an inverted shell shape which, as seen from either side elevation, is of generally rectangular shape and, as seen from either front or rear elevation, if of a truncated isosceles triangular shape. In general, the car top sign comprises: (a) A top panel 14 which, as seen in plan, is preferably trapezoidal in shape, (b) opposed first and second congruent main sign panels 16 and 18 which are connected along their respective main length of the top panel along fold lines 20 and 22 in the embodiment disclosed herein, and (c) a front and a rear panel or tongue 26 and 28 respectively which are also connected to the top panel between the main sign panels along fold lines 30 and 32 respectively, which fold lines intersect at circular shaped cutouts to reduce and distribute destructive tearing forces.

Referring first to the top panel, it is seen that it is provided with equilength longitudinal side edges defined by the aforesaid fold lines 20 and 22 and opposed front and rear edges which are perpendicular to the medial longitudinal center line of the top panel and which are defined by the fold lines 30 and 32. Also, a plurality of holes 34 are spaced along the medial longitudinal center line or altitude of the top panel for a purpose which will become more apparent hereinafter. The sign panels 16 and 18 are of equal size and are connected along the longitudinal edges of the top panel and foldable out of the plane of the top panel. The front and rear panels 26 and 28 are also foldable out of the plane of the top panel, so that the front, rear and side panels define a shell type body when the panels are connected together along their adjacent margins. Referring to the sign panels 16 and 18, the exterior surfaces thereof define a main sign area on which a message, such as the picture of a political candidate and his name, may be provided. The sign area is of generally trapezoidal shape between outwardly diverging legs 35, 35', 37 and 37' and outermost longitudinal edges 38 and 38'. A fold line 36 and 36' is provided along the marginal edge of the sign panels parallel to the outer longitudinal edge 38 and 38' and also parallel to the diverging legs 35 and 37, thus defining flap edges on each main sign panel, the flaps being designated by the numerals 40, 42 and 44 as well as 40', 42' and 44'. The ends of the flaps are provided with mating tapered edges between the parallel lengths thereof to accommodate a reverse bending of the flaps 42 and 42' to the position shown in FIG. 5 for the purpose of reinforcing the longitudinal edge 36 along the length thereof. Staples such as that indicated by the numeral 52 may be utilized to hold the flaps 42 and 42' in the folded back position.

Figure 3:
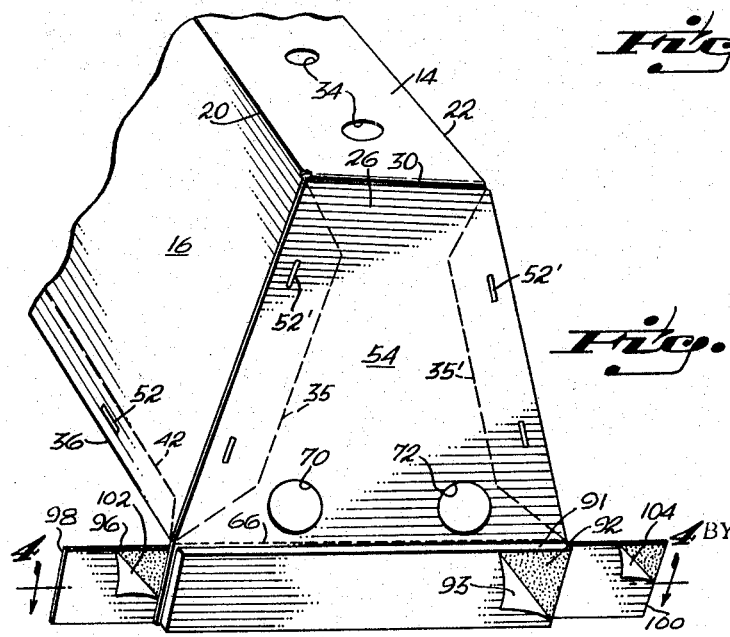
FIG. 3 is a perspective view of one end of the car top sign of FIG. 1.

Referring to the tongues 26 and 28, it is seen that the said forward tongue is foreshortened with respect to the rearward tongue, yet both the forward and the rearward panel are of the same general truncated isosceles triangular configuration, and preferably are related such that the isosceles base angles of each are equal. Each of these panels includes a main body portion 54, 54' with the base edge 66 and 66' being defined by a score to provide for folding which base line or fold line is parallel to the opposing fold line 30 and 32. A first and a second foot 67, 67' and 68. 68' of equal size extend distally from the base line and are separated from one another by a triangular cut extending from the distal-most edge to the aforesaid base line 66. Holes 70 and 72 are provided in each of the body sections of the forward and rearward panels adjacent the base line for a purpose which will become apparent and be explained hereinafter. The forward and rearward panels are adapted to be folded along the fold lines defined by score marks, 30 and 32, out of the plane of the top panel and to engage with the main sign panels to define the inverted shell type configuration seen in FIG. 1 with the flaps 40 and 44 of the main sign panels overlapping the marginal edge of the front and rear panels and being secured thereto by suitable fastening means such as the staples 52' or of rivets and shown in FIG. 3 for shipping erect or the male and female snap members 86 and 87 of FIG. 6 to ship in a knocked down flat form. Preferably the feet on the forward and rearward panels are folded inwardly and, when in the position shown in FIGS. 1 and 5, define a partial floor for the shell. It will be noted that the outer edges 88 and 90 of the feet are tapered to provide a slope sufficient so that when the feet are folded back as a partial floor, the thickness across the feet between the edges 88 and 90 is adapted to nest between the opposing main sign panels, that is, so that the feet are adapted to be folded into a slightly inclined plane which, if extended, would intersect the corresponding plane of the feet of the front panel about midway of the interior of the shell. The underside of each of the feet is provided with an adhesive strip of cushion type material 91, the outermost layer 92 of which is adhesively coated and is congruent or slightly foreshortened with respect to the outer boundaries of the area of the feet with the exception that the strip bridges the distance between the two feet. A liner 93 is provided to protectively overlay the adhesive coating prior to use, and may include an extending tab portion to facilitate removal of the liner from the adhesive. On the other side of the feet an adhesive strip 96 is provided which is relatively thin and extends across the entire length thereof and includes extending distalmost finger-type portions 98 and 100. The strip is securely held by reason of its adhesive quality to the feet; and the liners 102 and 104 are provided for the finger portions to protect the adhesive preliminary to use. The device, when assembled by folding the panels out of the plane of the top panel and connecting them together and after folding the feet back to define a partial floor, may be mounted to a car top simply by removing the liner from the cushion pad of the front panel feet and with the body of the shell at an inclined position so that it practically rests on the front panel and pressing the exposed adhesive of the cushion panel in the desired location on the front portion of the roof surface of an automobile. Thereafter, the car top sign is rotated about the fold line of connection of the front panel feet to the front panel so that the rear panel rests on the automobile roof top. The adhesive coating of the cushion is then removed and the car top sign is then in position on the car top. One may then secure it in position by inserting his fingers through the access openings of the rear panel and pressing the feet down so that they adhesively engage substantially along the entire length thereof. Thereafter the adhesive coating of the fingers may be pressed into engagement with the car top roof for additional holding power. In traveling, an automobile with a car top sign mounted in this fashion will remain in position on the automobile held in place only by the adhesive forces. It is apparent that adhesive feet may also be provided along the opposing main sign panel flap edges; however, it has been found that the utilization of the adhesive strip fastening means is sufficient when employed only on the front and rear panels in accordance with the manner taught herewith. Also, it is not necessary that the cushion with its adhesive outerlaying be completely captivated within the shell of the car top sign but this is preferred and it will be apparent that variations in the contour of roof top automobiles are accommodated by reason of the cushion type adhesive pad at the front and rear of the automobile and the fact that the opposing side panels may be slightly bowed outwardly so that the cushion adhesive means as well as the opposing reinforced edges of the main sign panels define a zone of surface contact between the car top sign and the roof top of a vehicle.

I claim:

1. A car top sign of weather resistant sheet material comprising; an inverted shell of generally trapezoidal shape as seen in either side elevation and of truncated isosceles triangular shape as seen in front and rear elevation, said shell including, a top panel having equilength longitudinal side edges and opposed front and rear edges, and having a flow through opening; a first and a second main sign panel of equal size, each connected along one of the longitudinal edges of the top panel; and opposed front and rear panels along said front and rear edges respectively, said front and rear panels each having a body section of truncated triangular isosceles shape and an access opening into the shell interior adjacent the base line, with the line of juncture of each body section and the top panel being along the truncated edge of the body section, and each said body section having feet portions extending distally of the base edge; fold lines along the line of juncture of the top panel and all of the other panels to facilitate folding of the other panels out of the plane of the top panel with the extending edges of the body section and of the sign panels defining a surface of contact for an automobile car top; and means to connect the margins of the inclined edges of said body section and the adjacent marginal edges of the sign panels to wall the interior of said shell between said all of the other panels and the top panel; and a fold line along each base line of the body section to facilitate folding of the feet portions out of the plane of the body sections and toward the other body section to partially floor the shell and overlay a portion of the surface of contact defined by said extending edges; and adhesive means on the feet to adhesively adhere to an automobile car top and hold the car top sign in a predetermined position thereon, said feet being accessible through said access opening and said adhesive means being responsive to pressure applied on said feet through said access openings.

2. A car top sign as set forth in claim 1 wherein said adhesive means comprises a strip of flexible plastic material having opposite main adhesively coated faces to adhesively engage the feet with one face and the surface of contact with the other face; and a liner for said faces.

3. A car top sign as set forth in claim 2 wherein the said adhesive means is of strip form and of a longitudinal length longer than the base of the body section and arranged on said feet to extend laterally outwardly of the feet when the car top sign is in position on an automobile car top to expand the zone of adhesive contact with the top of the automobile.

4. A car top sign as set forth in claim 2 wherein the said strip is of flexible plastic material of a uniform thickness greater than one-thirty second of of an inch having an adhesive face adhering to the underside of the floor surface of said feet and an opposite adhesive face to adhere to the top surface of an automobile.

5. A car top sign as set forth in claim 1 wherein the said means to connect the margins of the inclined edges of said body section and the adjacent marginal edges of the sign panels comprise flap means on the sheet material to overlap the adjacent panel and fastener means to connect the overlapping flap to the associated panel.

6. A car top sign as set forth in claim 5 wherein the said means comprise staple means.

7. A car top sign as set forth in claim 1 wherein the said sign panels include a flap on the extending edge and a fold line for each flap along said extending edge to facilitate folding of the flap edge reversely to overlay the marginal edge of said sign panels so that the extending edge is of double thickness and means to connect the marginal edge to the flap to overlay the inside rim area of the shell.

8. A car top sign as set forth in claim 1 wherein the said feet portions of said front and rear panels include a V-shaped notch from an apex medially of the base line with the edges diverging outwardly to the distal edge of the feet portion.

9. A car top sign as set forth in claim 1 wherein the said top panel is trapezoidal in shape as seen in plan with the front panel being of a smaller area than said rear panel.

10. A car top sign as set forth in claim 1 wherein the isosceles angles of the body section of the front and rear panels are equal.

References Cited by the Examiner
UNITED STATES PATENTS

| | | | |
|---|---|---|---|
| 2,960,786 | 11/1960 | Wagner | 40—129 |
| 3,225,475 | 12/1965 | Shank | 40—129 |
| 3,254,434 | 6/1966 | Gintoft | 40—129 |

EUGENE R. CAPOZIO, *Primary Examiner.*

W. W. NIELSEN, *Assistant Examiner.*